United States Patent [19]

Shiba

[11] Patent Number: 4,466,582

[45] Date of Patent: Aug. 21, 1984

[54] TAPE GUIDE FOR MAGNETIC TAPE CARTRIDGE

[75] Inventor: Haruo Shiba, Tokyo, Japan

[73] Assignee: TDK Electronics Co., Ltd., Tokyo, Japan

[21] Appl. No.: 418,602

[22] Filed: Sep. 16, 1982

[30] Foreign Application Priority Data

Oct. 6, 1981 [JP] Japan .............................. 56-147747[U]

[51] Int. Cl.³ ......................... G03B 1/04; G11B 15/32; B65H 23/04
[52] U.S. Cl. .................................... 242/197; 226/196; 242/76; 242/199
[58] Field of Search ................................ 242/197–200, 242/76, 55.19 A; 226/189, 193, 196–200; 360/95, 96.1, 132

[56] References Cited

U.S. PATENT DOCUMENTS

| | | | |
|---|---|---|---|
| 3,405,855 | 10/1968 | Daly et al. | 226/97 X |
| 4,191,345 | 3/1980 | Sato et al. | 242/197 |
| 4,389,010 | 6/1983 | Oishi et al. | 226/196 |

Primary Examiner—Leonard D. Christian
Attorney, Agent, or Firm—Oblon, Fisher, Spivak, McClelland & Maier

[57] ABSTRACT

A tape guide for magnetic tape cartridge including a main body of the tape guide made of a synthetic resin material, the main body of the tape guide having a multitude of finely depressed and elevated continuous rectangular portions on and around the outer surface thereof, and a metal layer formed on the outer surface of the tape guide main body.

9 Claims, 6 Drawing Figures

TAPE GUIDE FOR MAGNETIC TAPE CARTRIDGE

BACKGROUND OF THE INVENTION

1. Field of the Invention

This invention relates to a tape cartridge in general, and, more particularly, it is concerned with a tape guide for guiding a magnetic tape during its running in a magnetic tape cartridge for VTR.

2. Description of the Prior Art

Conventionally, the magnetic tape cartridge is made up in such a manner that an upper half case and a lower half case, each being formed of a plastic material, are put together, then a tape feeding reel and take-up reel are fitted in an internal space defined by the upper and lower half cases, and the magnetic tape is loaded on and extended between the two reels. Further, a plurality of tape guides are provided in the magnetic tape cartridge to guide the magnetic tape to cause it to pass through a predetermined path, and to stabilize running of the magnetic tape so as to make it possible to record and reproduce informations to a degree of satisfaction.

FIGS. 1 and 2 of the accompanying drawing illustrate, to a good understanding of readers of this specification, one embodiment of the internal structure of the conventional magnetic tape cartridge for VTR, with the upper half case of the magnetic tape cartridge 1 being removed. As exemplified in this embodiment, the magnetic tape T is fed from a tape feeding reel 4 to a take-up reel 6, both being disposed in the lower half case 2. In this instance, the magnetic tape T is guided from the tape feeding reel 4 to a front working part of the cartridge by tape guides 14, 12 and 10, and then further guided to the take-up reel 6 through a tape guide 8 to be taken up on the reel. In the embodiment of the magnetic tape cartridge shown in FIGS. 1 and 2, the tape guides 10 and 12 are fitted on and fixed to shafts 10a and 12a formed at predetermined positions in the lower half case 2 as an integral part thereof, and the tape guide 8 is made freely rotatable on a shaft 8a. Also, the tape guide 14 is a guide pole implanted in a hole 14a formed in one part of the lower half case 2. However, it should be borne in mind that the number, embedding position and structure of the tape guide to be disposed in the magnetic tape cartridge are not limited to the illustrated embodiment, but various modifications may be contemplated to secure stable running of the tape T.

So far, attempts have been made as to constructing this kind of tape guide with metal so as to lower the friction between the tape and the tape guide during running of the tape to prevent the same from getting damaged due to its contact with the tape guide, and to further make smooth the running and guiding of the tape, thereby reducing or perfectly solving the problem to occur during running of the tape. Further, from the standpoint of its use, the tape guide has to be kept away from magnetization, for the reason of which it is generally made of a non-magnetic stainless steel. As is clear from the foregoing statement, it is highly important that the tape guide have a flat and smooth surface, hence the finishing work of its surface to be in contact with the tape is of particular importance.

However, the tape guide made of the conventional nonmagnetic stainless steel material had such disadvantages that not only the material itself was of a high price, but also its productivity was low and its manufacturing cost became high because of poor cutting property stainless steel material possesses in general and necessity for the surface finishing work. Such metal tape guide is further liable to be scratched on its finished surface during a period after its finishing work and before its assemblage in the cartridge, so that very careful handling of the tape guide is needed during this period from its manufacture to its assemblage into the tape cartridge. This has been one of the causes for low productivity in the magnetic tape cartridge to be manufactured in a great quantity.

It has been proposed that the tape guide be formed of a synthetic resin with a view to solving the abovementioned defect which the metal tape guide posseses, but the proposal cannot be totally satisfactory. That is to say, the resin-made tape guide had a serious shortcoming such that the magnetic tape of the synthetic resin is in close contact with the smooth surface of the tape guide to considerably increase the friction between it and the running tape with the consequence that it becomes difficult to achieve the stable running of the tape. Also, dust taken away from the tape due to its frictional contact with the tape guide sticks to the surface of the magnetic tape to be a cause for drop-out of the tape.

In order to solve the defect which the conventional tape guide possesses, the present inventor has proposed the tape guide for the magnetic tape cartridge, which is made of a synthetic resin material and which has a multitude of finely depressed and elevated continuous rectangular portions on the outer surface thereof. This tape guide makes it possible to remarkably reduce the contact surface with the magnetic tape, thereby reducing the friction of the running tape with the tape guide, and to secure stable running of the tape, hence the tape guide has such an effect that no finishing work of the tape contact surface is required even at the time of its manufacture, and is highly suitable for a mass-production.

However, it has been found out that this tape guide of the synthetic resin had a problem in respect of its durability, particularly, sticking of wear-out dust to the tape surface, and the tape guide is charged with static electricity due to friction between the tape guide and the magnetic tape to attract dust floating in the surrounding atmosphere, giving bad effect to the magnetic tape.

SUMMARY OF THE INVENTION

It is therefore a primary object of the present invention to provide an improved tape guide made of a synthetic resin material.

It is another object of the present invention to provide an improved tape guide for a magnetic tape cartridge, which has on its outer surface a multitude of alternate continuous rectangular depressions and elevations as finely cut to considerably reduce the contact surface with the magnetic tape and to lower the friction between it and the running tape, thereby making it possible for the tape to travel stably.

It is still another object of the present invention to provide an improved tape guide for a magnetic tape cartridge, which is further coated, on the outer peripheral surface of the main body of the synthetic resin tape guide with a multitude of alternate depressions and elevations being formed on its outer peripheral surface, with a metal layer by means of, for example, non-electrolytic plating process.

It is yet another object of the present invention to provide a tape guide for a magnetic tape cartridge having high performance, which is durable against repeated use, and is not charged with static electricity.

It is still yet another object of the present invention to provide a tape guide which requires no machining work, in particular, no finishing work of the tape contact surface, and is highly suitable for a large amount of its manufacture.

According to the present invention, in general aspect of it, there is provided a tape guide for magnetic tape cartridge, which comprises a main body of said tape guide made of a synthetic resin material, said tape guide having a multitude of finely depressed and elevated continuous rectangular portions on and around the outer surface thereof; and a metal layer formed on the outer surface of said tape guide main body.

There has thus been outlined, rather broadly, the more important feature of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may be readily utilized as a basis for the designing of other structure for carrying out the several purposes of the present invention. It is important, therefore, that the claims be regarded as including such equivalent construction so far as they do not depart from the spirit and scope of the present invention.

BRIEF DESCRIPTION OF THE DRAWING

Specific embodiments of the present invention have been chosen for the purpose of illustration and description, and are shown in the accompanying drawing, forming a part of the specification, in which.

DETAILED DESCRIPTION OF THE PREFERRED EMBODIMENTS

In the following, detailed explanations will be given in reference to the accompanying drawing as to the tape guide for the magnetic tape cartridge according to the present invention.

Figure 1:
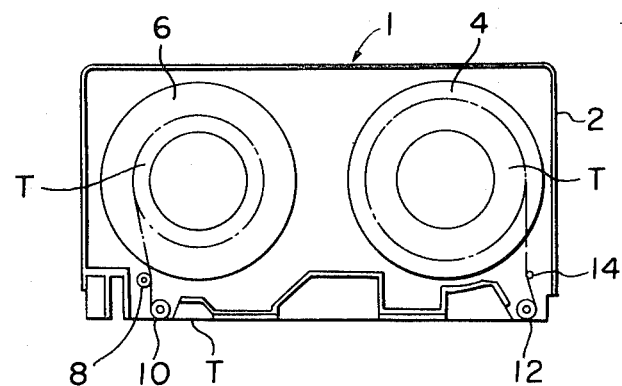
FIG. 1 is a schematic plan view of the magnetic tape cartridge for VTR.
Figure 3:
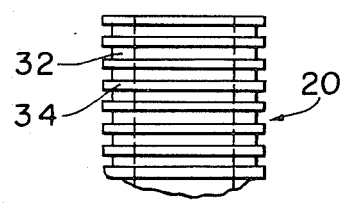
FIG. 3 is an enlarged partial front view of one embodiment of the tape guide according to the present invention.
Figure 4:
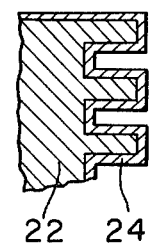
FIG. 4 is an enlarged partial cross-sectional view of the tape guide shown in FIG. 3.

Referring to FIGS. 3 and 4 illustrating one embodiment of the tape guide according to the present invention, the tape guide 20 is constructed with a tape guide main body 22 made of a synthetic resin material and a metal layer 24 formed to cover the outer peripheral surface of the main body. The tape guides 20 as illustrated in these figures of the drawing as the examples are in the form of a cylindrical roller, on the outer peripheral surface of which the depressed continuous rectangular portion 32 and the elevated continuous rectangular portion 34 are alternately formed. In general, an outer diameter of the tape guide roller as finished is set at 6 mm, in which case the elevated portion 34 is formed with its width of from 0.01 mm to 0.1 mm, and at a space interval between the adjacent ones of from 0.05 to 0.15 mm. In the meantime, depth of the depressed portion 32 from the outer peripheral surface is set in a range of from 5 to 20 microns.

Further, when the tape guide 20 takes a shape of a rod, or a pole, the outer diameter thereof is given as 2.6 mm, although the depressed portion 32 and the elevated portion 34 to be formed on and around the outer peripheral surface of it remain within the abovementioned dimensional range.

Figure 5:
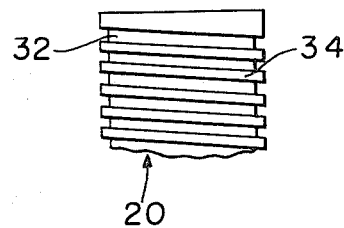
FIGS. 5 and 6 are respectively enlarged partial front view of other embodiments of the tape guide according to the present invention.
Figure 6:
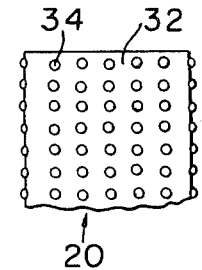
Figure 2:
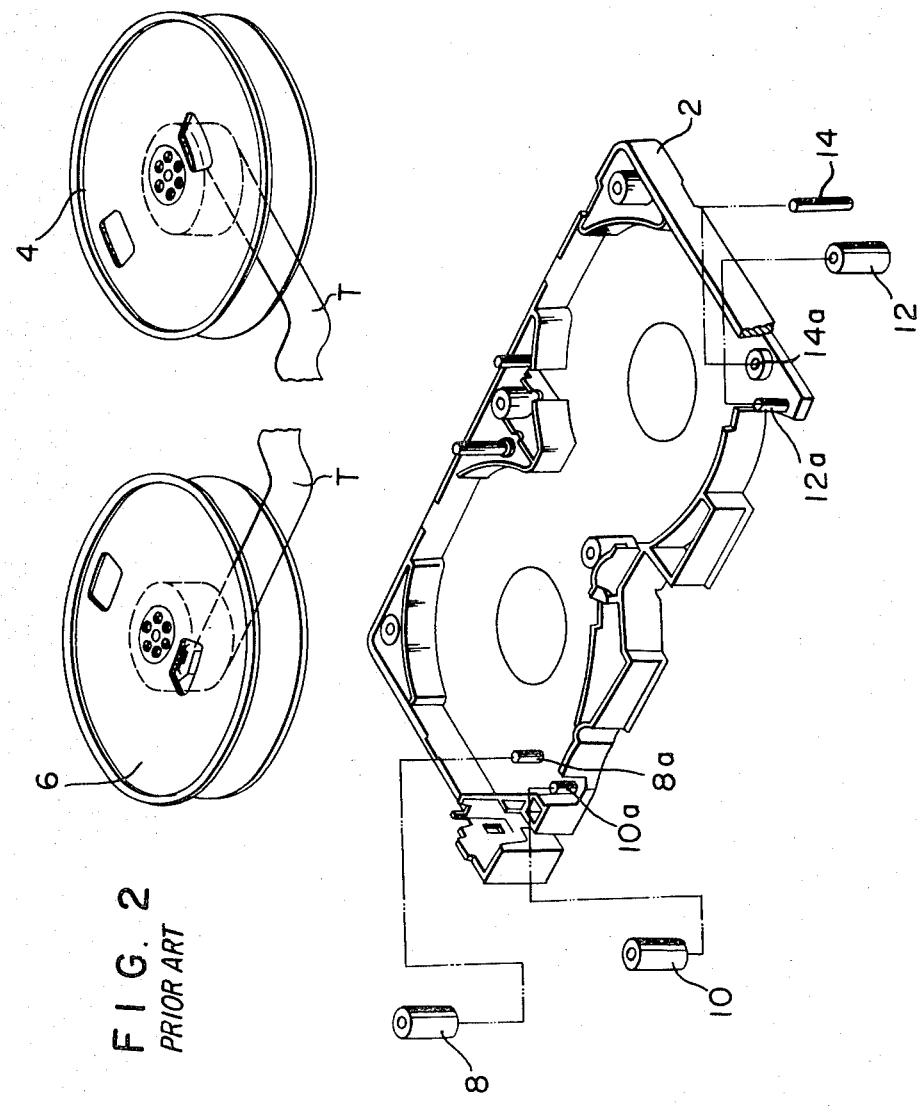
FIG. 2 is a schematic exploded view of the cartridge shown in FIG. 1.

It is to be noted in this connection that, while the recessed portion 32 and the elevated portion 34 to be formed on and around the outer peripheral surface of the tape guide may be arranged alternately in a stripped pattern, they may also be formed in a spiral pattern as illustrated in FIG. 5. Further, they may be in a pattern as shown in FIG. 6, in which a number of small projections 34, each having a dimension of 0.005 to 0.020 mm in height and 0.01 to 0.1 mm in diameter, are arranged on the outer peripheral surface of the tape guide with a uniform space interval among them of from 0.05 to 0.15 mm. Furthermore, the same result can be apparently obtained even when a multitude of finely recessed portions are formed in and around the outer peripheral surface of the cylindrical tape guide, although this embodiment is not illustrated in the drawing.

By thus constructing the tape guide as mentioned above, close contact of the magnetic tape to the surface of the tape guide is reduced, which is turn decreases the friction between them, whereby stable guiding and running of the magnetic tape are made possible.

In addition, by providing a metal layer on the surface of the tape guide, it can be made durable, whereby highly stable tape running can be attained without its surface being scraped off, even when the tape guide is in contact with the magnetic tape with whatever surface coarseness and at whatever tape running speed. Moreover, for the reason that the surface of the tape guide is covered with the metal layer, there can be avoided generation of static electricity due to contact of the magnetic tape with the tape guide, whereby various inconveniences such as attraction to the tape surface of dust in the surrounding atmosphere to be brought about by the static electricity, and so forth.

In the following, brief explanations will be given as to a method of manufacturing the tape guide 20 according to the present invention. The main body 22 of the tape guide is made of a synthetic resin material. The synthetic resin materials suitable for the purpose are polyacetal, polyethylene, polyamide, and other crystalline resins. While the very fine depressions and elevations on the surface of the tape guide main body 22 can be formed by effecting a secondary processing such as, for example, etching and machining work, it is preferable to form these pattern simultaneously with shaping of the tape guide main body.

The present inventor has found out that, when a tape guide having, for example, an outer diameter of 6 mm and a depth of the depressed portion, i.e., a height of the elevated portion, of from 0.005 to 0.02 mm, is manufactured using a synthetic resin with its contraction coefficient at shaping of 0.8% and above, the synthetic resin for the tape guide contracts after it has been injected into a single body of a metal mold, and could be readily taken out of the metal mold as the tape guide in a desired shape and with an extremely smooth outer surface without necessity for constructing the metal mold in the form of a split mold, or for taking it out forcibly under pressure.

According to this method, there can be obtained the tape guide having an extremely smooth surface with its being kept away from damaging. As the consequence of this, there is no necessity for the secondary processing and the finishing work, so that the manufacturing steps thereof become very simple.

In the next place, an ordinary chemical plating process (non-electrolytic plating) is effected on the tape guide main body 22 which has been manufactured in the abovementioned manner to thereby form a metal layer of 1 to 15 microns thick on the outer peripheral surface thereof. The metal layer may be of chromium (Cr) or nickel (Ni). More preferably, the metal layer is a non-electrolytically plated layer, which consists of a metal and non-meltable fine particles having a lubricating property, e.g., teflon powder, graphite powder, or the like, at a certain definite ratio in the form of a composite eutectoid. It is also possible that the metal layer be formed by an ordinary vapor deposition of the abovementioned metals, and so forth.

Since the tape guide according to the present invention is constructed as explained in the foregoing, it has various functions and resulting effects such that it enables the contact surface with the magnetic tape to be remarkably reduced, the friction between it and the running tape to be decreased, and the tape to run stably, and, at the same time, it increases its durability against repeated use and prevents static electricity from occurring. Furthermore, the tape guide according to the present invention can be manufactured without necessity for the machining work, hence it has an additional advantage of being highly suitable for industrialized mass-production.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A tape guide for a magnetic tape cartridge, which comprises:
   a main body of said tape guide made of a synthetic resin material, said tape guide main body having a multitude of finely depressed and elevated continuous rectangular portions on and around an outer surface thereof; and a metal layer formed on the outer surface of said tape guide main body.

2. The tape guide as set forth in claim 1, wherein said metal layer is a thin film selected from a group consisting of chromium (Cr) and nickel (Ni).

3. The tape guide as set forth in claim 1, wherein said metal layer is a non-electrolytically plated layer consisting of a metal and non-meltable fine particles having a lubricating property at a predetermined ratio and in the form of a composite eutectoid.

4. The tape guide as set forth in claim 3, wherein said metal is selected from a group consisting of nickel (Ni) and chromium (Cr).

5. The tape guide as set forth in claim 3, wherein said non-meltable fine particles with a lubricating property is selected from a group consisting of teflon powder and graphite powder.

6. The tape guide as set forth in claim 1, wherein said tape guide is in the shape of a roller or a pole, and said multitude of said depressed and elevated continuous rectangular portions are arranged in a stripe pattern on and around an outer peripheral surface of said tape guide.

7. The tape guide as set forth in claim 1, wherein said tape guide is in the shape of a roller or a pole, and said multitude of said depressed and elevated continuous rectangular portions are arranged in a spiral pattern on and around an outer peripheral surface of said tape guide.

8. The tape guide as set forth in claim 6 or 7, wherein a depth of each said depressed continuous rectangular portion is from 0.005 to 0.02 mm, a width of each said elevated continuous rectangular portion is from 0.01 to 0.01 mm, and said elevated portion is formed at a space interval of from 0.05 to 0.15 mm.

9. The tape guide as set forth in claim 1, wherein said tape guide main body is made of a synthetic resin selected from a group consisting of polyacetal, polyethylene, and polyamide.

* * * * *